3,123,908
METHOD OF PRODUCING A LAMINATED STRUCTURE
Ernest R. Boller, Marion, Ind., assignor to The Boller Development Corporation, Marion, Ind., a corporation of Indiana
Filed Apr. 5, 1956, Ser. No. 576,481
12 Claims. (Cl. 29—471.1)

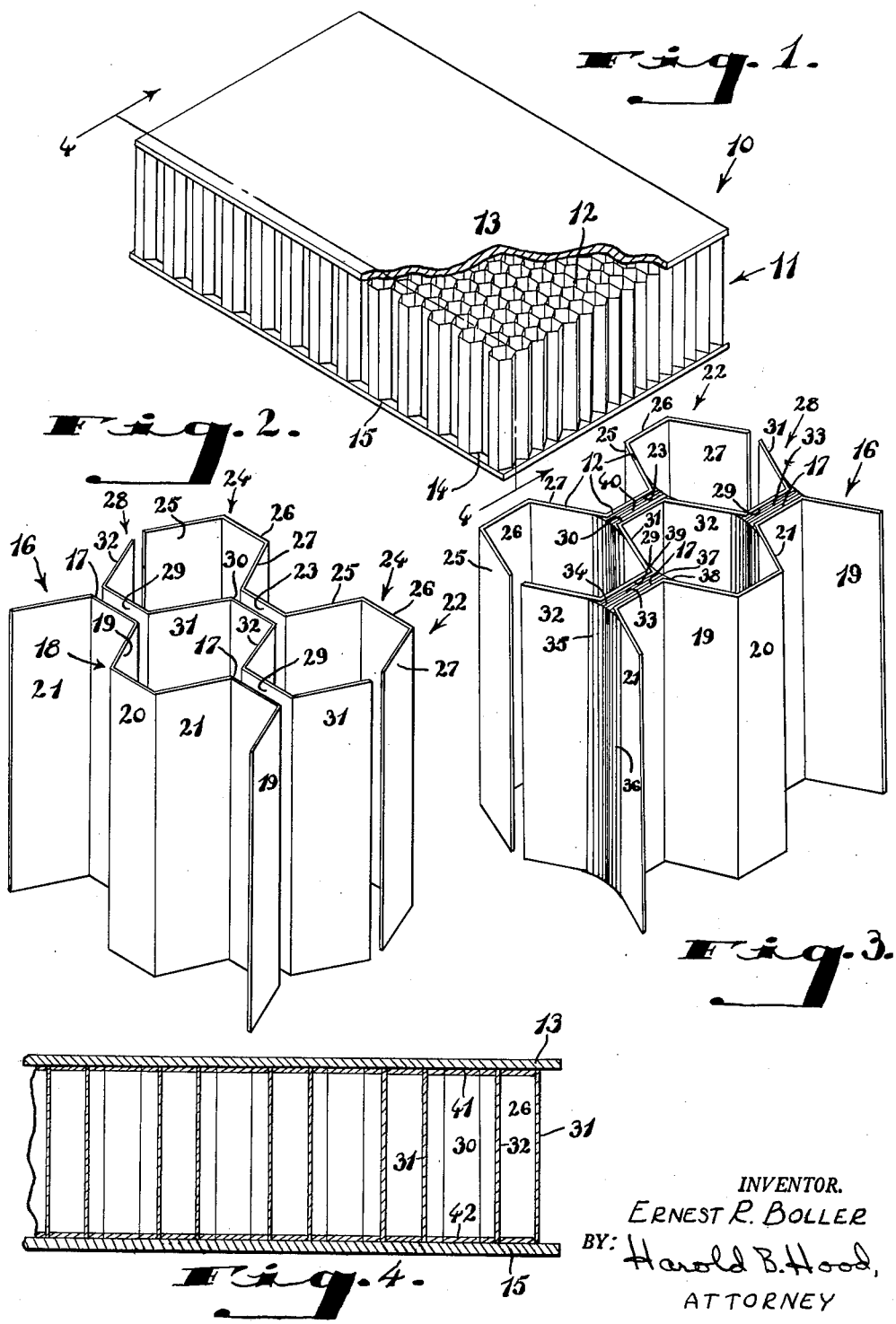
March 10, 1964    E. R. BOLLER    3,123,908
METHOD OF PRODUCING A LAMINATED STRUCTURE
Filed April 5, 1956
INVENTOR.
ERNEST R. BOLLER
BY: Harold B. Hood,
ATTORNEY United States Patent Office 3,123,908
Patented Mar. 10, 1964

The present invention relates to a laminated structure and method of producing the same, and is directed primarily to a process for hot-dig bonding two or more pieces together to produce a metal laminate. The process finds its primary utility in bonding together metal pieces whose juxtaposed surfaces include separated areas; but it may be used in bonding other types of metal pieces. The process is designed to produce an improved metal laminate, in that the product of the process is more stable than can be produced by previously known methods, while the process involves economies over over previously known processes for accomplishing analogous results, whereby the resultant product is very substantially less expensive than previously known products having comparable characteristics.

The term "laminated metal structure" is used in its broadest sense to define a variety of forms or designs. The simplest of such forms, of course, consists of a pair of generally flat sheets, bonded together over interrupted areas of their juxtaposed surfaces; but the invention has been particularly designed for, and will be described in connection with, the production of metal honeycomb structures.

Such structures are known and widely used in industry where structural elements are required which must be light in weight, in proportion to their strength, particularly in endwise compression; and they are conventionally made by crimping component sheets or strips according to a regular pattern and bonding together a plurality of such crimped sheets, by means of spot welding juxtaposed surfaces of adjacent sheets to form a cellular structure. Usually, each such strip or sheet is so crimped as to provide a plurality of parallel, laterally-separated, band-like areas disposed in a common plane and separated by regions displaced in a common direction from said common plane, each such displaced area including a band-like region, parallel to the above-mentioned common plane, and bounded on each lateral edge by a region inclined between the parallel planes. Adjacent strips are then arranged so that the coplanar areas of each strip are in face-to-face registry to the coplanar areas of at least one adjacent strip, and the juxtaposed areas are welded together. This is, of course, a time-consuming and expensive operation; and it is found, in practice, that the results are far from perfect and that many failures of adhesion occur in the commercial product. The intended end product, of course, is a cellular body, the several cells being arranged upon parallel axes, extending from edge to edge of the respective strips, being spaced longitudinally and transversely of the final assembly, and being substantially hexagonal in cross-section. Such assemblies, when reasonably effectively integrated, are very strong in proportion to their weight, particularly in compression axially of the individual cells, have good insulating properties for both heat and sound, and are particularly valuable in aircraft construction.

However, because of the procedures which have heretofore been known for producing such units, they have been almost prohibitively expensive for many uses to which they are well adapted.

Another known method of producing such units involves the steps of tack welding the components and then furnace brazing the assembly. A still further procedure consists in producing a bond between flat sheets of metal, with strips of a resin adhesive, and then forming the cells by pulling apart the portions of the sheets between the bonds. This procedure, of course, is applicable to only fairly soft metals, such as aluminum, and results in a product which is serviceable only at low temperatures and in which maxium strength cannot be attained due to the irregularity of the cell wall shapes.

It is the primary object of this invention to produce these metal laminates by a method which assures consistent and complete bonding of the component elements, which does not limit the size of the structures and which is applicable to a wide variety of component metals and bonding metals. It is a further object of the invention to provide a procedure whereby the above-described units may be rapidly and inexpensively, but effectively, produced. It is a still further object of the invention to bond the components in such manner that the bonding metal itself contributes to the strength of the structure.

In some instances, it is desirable, if not absolutely essential, to strengthen such a honeycomb structure by sealing one or both ends of the cells with a covering sheet. In such instances, it is essential that the ends of the cell walls shall be strongly bonded to the cover sheet, and that the bonding shall be effective between the covering sheet and the entire extent of the corresponding ends of all of the cell walls of the honeycomb. In the past, this sealing of the cell ends has usually been attempted by furnace brazing which has been quite unsatisfactory not only in that it has not accomplished complete bonding but also because the procedure is costly and because only one end at a time of the cells can be bonded to a covering sheet. A further object of the present invention, then, is to provide a novel procedure for effectively bonding cover sheets to one or both ends of such a honeycomb structure.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific constructions illustrated and described, or in the specific steps stated, so long as the scope of the appended claims is not violated.

FIG. 1 is a perspective view of a completed honeycomb structure, constructed in accordance with the present invention, and including cover sheets for both ends of the honeycomb, one of said cover sheets being broken away for clarity of illustration;

FIG. 2 is an enlarged perspective view of two end strips and a single intermediate strip, arranged for subsequent bonding, the spacing between adjacent strips being somewhat exaggerated;

FIG. 3 is a similar view of the same strips after bonding, with the thickness of bonding metal somewhat exaggerated; and FIG. 4 is an enlarged fragmental section taken substantially on the line 4—4 of FIG. 1.

In FIG. 1, the completed honeycomb structure is indicated generally by the reference numeral 10, and consists of a cellular body, indicated generally by the reference numeral 11, having upper and lower end surfaces 12 and 14, which are substantially planar, and which are closed, respectively by cover sheets 13 and 15. The cellular body 11 is made up, according to the present invention, from a pair of end or border strips 16 and 22, assembled with one or more intermediate strips 28. Preferably, the strip 16 will be preliminarily crimped to provide a plurality of band-like, separated areas 17 disposed in a common plane, and separated by regions 18 displaced in a common direction from that common plane. Preferably, each displaced region 18 will consist of an inclined panel 19, a panel 20 disposed in a plane parallel to the common plane of the areas 17, and an oppositely inclined panel 21. Such strips may be formed from any reasonably ductile metal, in any well known manner.

The opposite border strip 22 is similarly formed to provide a plurality of band-like areas 23, disposed in a common plane, and separated by areas 24 which are displaced in a common direction from that common plane. As shown, each area 24 comprises a panel 25 inclined away from the plane of the areas 23, a band-like panel 26 disposed in a plane parallel to the plane common to the areas 23, and an oppositely inclined panel 27.

Each intermediate strip 28 is similarly crimped to provide a plurality of band-like areas 29, disposed in a common plane, and separated by similar areas displaced in a common direction from that common plane, each such displaced area consisting of a band-like panel 30 joined to the adjacent panels 29 by inclined panels 31 and 32; and it is a requisite of the intermediate strips that their panels 30 shall be disposed in a common plane.

Any desired number of intermediate strips 28 may be assembled between boundary strips 16 and 22, the panels 29 of the strip immediately adjacent the strip 16 being arranged in face-to-face registry with the panels 17 of the strip 16; and the panels 30 of the strip 28 adjacent the boundary strip 22 being arranged in face-to-face registry with the panels 23 of that boundary strip.

Aluminum, or an aluminum alloy rich in aluminum, makes a satisfactory bonding metal for use with strips of metals of the character usually used in these constructions; but the only essential requirements for the bonding metal are that it shall have sufficient tensile strength to meet the requirements of the finished structure and that its melting point shall be substantially below the softening temperature of the metal from which the strips are formed.

A characteristic of most available bonding metals is that they will not establish a complete and effectively adherent coating of most other metals, when such other metals are dipped into a molten bath of the bonding metal, unless the surface of the dipped metal is first treated in some fashion, to remove oxides and otherwise to affect the surface, to "sensitize" or render such surface receptive to the bonding metal. However, most bonding metals will adhere, to some extent, but with less than perfect coverage, to most other metals which are dipped into such a molten bath.

In honeycomb structures of the character with which the present invention is primarily, but not solely, concerned, it is usually preferable to inhibit any adherence of bonding metal to surfaces of the strips other than those directly involved in the bonds; and therefore, in the preferred form of my invention, as applied to the production of such honeycomb structures, the first step will always constitute a treatment of the strips to inhibit adherence to the surfaces thereof of the bonding metal to be used. This usually involves a physical treatment, such as heating to develop an oxide coating, or a chemical treatment, such as deposition of another metal or compound on the strip surfaces.

Thereafter, selected areas of each strip will be treated to render such selected areas receptive to the bonding metal. In some instances, I prefer to refer to this step as "sensitizing" selected areas of the elements to be bonded. Essentially, the sensitizing process consists in cleaning and fluxing operations known to be necessary for the effective hot-dip coating of the selected metals with the selected bonding metal; and the operation will vary with metal combinations used. Where ferrous strips are to be bonded with aluminum or aluminum alloys, however, I prefer to follow the procedure disclosed in my copending application Serial No. 574,595, filed March 29, 1956, for Process for Hot-Dip Coating of Metals (now abandoned). Such procedure comprises the steps of coating the selected areas 17 and 29, for instance, of adjacent strips with lead and then displacing the lead coating with aluminum by dipping the lead-coated strips in a bath of molten aluminum. As is pointed out in said application Serial No. 574,595, it is easy to coat the surfaces of ferrous materials with lead, and the lead is readily displaced by aluminum in a molten aluminum bath. In effect, the lead serves as a "metallic flux," permitting rapid and complete coverage of the desired surface with aluminum. Preferably, the lead-coated areas of the work should be dipped into a fused alkali chloride bath which is free of heavy metals before dipping into the aluminum bath. An optimum fused alkali chloride bath may consist of a mixture of the chlorides of sodium, potassium and lithium, with a layer of an alkal metal at the bottom.

When this procedure is followed, the adherence of the aluminum to the ferrous metal is almost perfect, and there are no pin holes in the aluminum coat. Thus, if the crimped strips have their mating surfaces coated with lead to "sensitize" those surfaces and if the mechanical steps outlined hereinbelow are then followed, using aluminum as the bonding metal, excellent results will be attained.

Referring, again, to the drawings, the surfaces of the panels 17 of the strip 16 which are to face toward the interior of the body 11, the faces of the panels 23 of the strip 22 which are to face toward the interior of said body, and the outwardly-presented faces of the panels 29 and 30 of the intermediate strips 28 will be selected for the sensitizing treatment. Thereafter, the strips 16, 22 and 28 are assembled in the arrangement indicated in FIG. 2 and, while held in such arrangement, with the panels 29 and 30 of each intermediate strip 28 in registry, respectively, with the panels 17 of a strip 16 and the panels 23 of a strip 22, or with panels 30 and 29, respectively, of adjacent, additional intermediate strips 28, the assemblage of strips is dipped in a molten bath of a selected bonding metal. The assemblage of sheets may be held in optimum arrangement in a frame, during this operation and preferably, pressure is applied to the assemblage, in a direction substantially normal to the surfaces 17, 23, 29 and 30, tending to urge the registering faces of the several strips toward each other. This pressure should not be sufficient, of course, to extrude all of the molten bonding metal from between registering surfaces, but will be of such magnitude as to retain a mass of bonding metal of desired thickness between such registering surfaces.

Usually, the bonding metal bath will be held at a temperature ten to fifty degrees above the melting point of the bonding metal, but well below the melting point of the strip metal. The time of immersion will usually be between three seconds and ten seconds. Because of the sensitizing treatment to which selected areas of the strips have been subjected, the bonding metal will completely wet the sensitized surfaces of the strips, will be retained therebetween when the assemblage is withdrawn from the bath, and will extend, in the fashion of a meniscus, at 34 and 37, into narrow regions 35 and 36 on the panels 32 and 21 and regions 38 and 39 on the panels 19 and 31. Thus, fillet-like extensions of the bonding-metal layers 33 project beyond the registering areas of the adjacent strips to add materially to the strength of the finished body 11. To this end, it is sometimes necessary to extend the sensitizing treatment slightly onto the surfaces of the inclined panels adjacent the coplanar surfaces of the strips.

The assemblage is withdrawn from the molten bath while its components are still firmly held in position and the above-mentioned pressure is preferably continued until the adhering bonding metal has frozen. Excess bonding metal may be removed from the assemblage by any of the conventional procedures, such as shaking, blasting, or simple draining.

If the component strips have been preliminarily subjected to the treatment for inhibiting adherence of the bonding metal, there will be substantially no adherence of bonding metal to any areas of the component strips which have not been sensitized; and, in some instances, that preliminary inhibiting step is unnecessary, either because the normal surface of the component strips is so unreceptive to the bonding metal in molten condition that no substantial adherence will occur except in sensitized areas, or because in particular applications, random adherence is tolerable.

It will be appreciated, of course, that in some applications of the invention, it would be possible to conduct a continuous operation, continuous strips being passed through the preliminary inhibiting and sensitizing operations and then being mechanically brought into registering association just before passing through the molten metal bath, and being held together after emergence therefrom by suitable mechanical equipment.

It will be noted that, according to the present invention, all of the bonds in a laminated structure are formed simultaneously, which of course results in a great reduction in labor cost as compared with previously known methods which involve individual formation of the respective bonds. The formation of the bonds beneath the surface of a molten bath of bonding metal insures consistent and complete bonding, thereby avoiding the deficiencies which are inherent in conventional welding, brazing or soldering operations. Additionally, the present procedure overcomes all of the difficulties which are encountered in attempting to cause a liquid metal to flow over a relatively cold metal surface in a gaseous atmosphere, such as low fluidity of the liquid metal, high interfacial tension, the formation of oxides and other compounds on the metal surfaces, and the inclusion of gases and foreign compounds in the bond.

It has been said that, in many applications, one or both of the open cellular ends 12 or 14 of the honeycomb structure 11 must be sealed or covered. According to the present invention, this can be accomplished by a procedure similar to that above-described. The extreme edges of the cell walls, and a narrow region immediately adjacent those edges, on each major face of each cell wall, will be sensitized in the manner above-described; and a plate 13 or 15 will be suitably treated. In some instances, a treatment to inhibit adherence of the bonding metal will be applied to such a plate, and thereafter, one major surface of the plate will be sensitized by the treatment above-described. In other instances, the inhibiting step will not be necessary. Then, the sensitized face of the plate 13 will be brought into substantial engagement with the extreme edges of the honeycomb cell walls in the relationship indicated in FIG. 1; and, with the plate and honeycomb held in this relation, the assemblage will be immersed in a molten bath of bonding metal. In some instances, it will be best to dip the assemblage very shallowly into the bath, so that only the plate 13 and that portion of the body 11 immediately adjacent its top surface 12 will be immersed. Preferably, a controlled pressure will be applied to the parts, urging the sensitized areas thereof toward each other; and the parts will be held in assembled relation after withdrawal from the bath, until the bonding metal has frozen. Thereby a bonding layer 41 will be formed, adhering tenaciously to the sensitized surfaces of the plate 13 and of the body 11, as indicated at 41 in FIG. 4.

By a similar procedure, the plate 15 may be secured to the opposite surface 14 of the body 11 through a bonding layer 42.

For some applications, it may be necessary or desirable to minimize entrapment of bonding metal within the honeycomb structure; and to that end, a modified procedure may be followed. After preliminary treatment of the honeycomb and the plate to be bonded thereto, as described above, to inhibit adherence of bonding metal to other areas, if desired, and to ensure adherence thereof to selected areas of both parts, the sensitized areas of both parts will be dipped in the bath of bonding metal concurrently, but out of mutual contact. Upon removal of the parts from the bath, the coated area of the plate will be promptly moved into contact with the freshly-coated area of the honeycomb, before the adhering bonding metal has time to freeze, and the parts will be held in such engagement, under controlled pressure as heretofore described, until freezing of the bonding metal is complete. It will be obvious that, through this procedure, plates 13 and 15, may, if desired, be concurrently bonded to surfaces 12 and 14, respectively, of the honeycomb.

Prior to my invention, the step of bonding such a honeycomb structure to a cover sheet usually has been attempted by furnace brazing; but this procedure has been quite unsatisfactory in that it has signally failed to provide complete bonding of all of the cell wall ends to the cover sheet. Apparently, the brazing metal cannot be made to flow effectively along the complex pattern of thin areas as required. Furthermore, such furnace brazing is quite expensive, as compared to the process of the present invention.

I claim as my invention:

1. The method of bonding together metal pieces which comprises the steps of treating selected, separated areas of two metal pieces to render such areas receptive to a molten metal, bringing such selected areas of one piece into close but separated juxtaposition to treated areas of the other piece, dipping the two pieces, while held in such juxtaposition, into a bath of molten metal to immerse such selected areas therein, exerting pressure upon said pieces to move such selected areas of the two pieces toward each other while such areas are so immersed, and removing said pieces from the bath, while continuing such pressure substantially throughout the freezing of the metal adhering to said pieces.

2. The method of making a metal honeycomb which comprises the steps of selecting a plurality of metal strips, each having a plurality of spaced areas disposed in a common plane and separated by other areas displaced in a common direction out of said plane, treating the coplanar areas of each of said strips to render such areas receptive to another metal in molten condition, arranging said strips in a series with the coplanar areas of each strip in substantially-engaging registry with the coplanar areas of at least one other strip and holding said strips against relative movement in directions parallel with said coplanar areas, dipping all of said strips, while held in such arrangement, into a molten bath of such other metal to immerse all of said treated areas therein, exerting pressure upon said arrangement of strips to move the treated areas of adjacent strips in a direction substantially perpendicular to said coplanar areas, toward each other while such areas are immersed, and then removing said strips from said bath while continuing such pressure substantially throughout the freezing of such other metal adhering to said strips.

3. The method of making a metal honeycomb which comprises the steps of selecting a plurality of metal strips, each having a plurality of spaced areas disposed in a common plane and separated by other areas displaced in a common direction out of said plane, treating substantially the entire surface of each of said strips to inhibit the adherence thereto of another metal in molten condition, then treating the coplanar areas of each of said strips to render such areas receptive to such other metal in molten condition, arranging said strips in a series with the coplanar areas of each strip in substantially-engaging registry with the coplanar areas of at least one other strip, dipping all of said strips, while held in such arrangement, into a molten bath of such other metal to immerse all of said treated areas therein, exerting pressure upon said arrangement of strips to move the treated areas of adjacent strips toward each other while such areas are immersed, and then removing said strips from said bath while continuing such pressure substantially throughout the freezing of such other metal adhering to said strips.

4. The method of making a metal honeycomb which comprises the steps of selecting a plurality of metal strips, each having a plurality of spaced areas disposed in a common plane and separated by other areas displaced in a common direction out of said plane, treating the coplanar areas of each of said strips to render such areas receptive to another metal in molten condition, arranging said strips in a series with the coplanar areas of each strip in substantially-engaging registry with the coplanar areas of at least one other strip, dipping all of said strips, while held in such arrangement, into a molten bath of such other metal to immerse all of said receptive areas therein, exerting pressure upon said arrangement of strips to move the receptive areas of adjacent strips toward each other while such areas are immersed, removing said strips from said bath while continuing such pressure substantially throughout the freezing of such other metal adhering to said strips, to produce a honeycomb structure, treating the surfaces at and immediately adjacent one cellular end of the honeycomb structure to render such surfaces receptive to another metal in molten condition, selecting a further sheet proportioned and designed substantially to cover said end of said structure, treating one major surface of said further sheet to render said surface receptive to such other metal in molten condition, bringing the receptive surface of said further sheet into juxtaposed but separated registry with said end of said honeycomb structure, immersing the juxtaposed, receptive surfaces of said honeycomb structure and of said further sheet in a molten bath of such other metal, exerting a force against said honeycomb structure and said further sheet to move the receptive surfaces of said honeycomb structure and of said further sheet toward each other while said receptive surfaces are so immersed, removing said honeycomb structure and said further sheet from said bath while substantially maintaining such force, and allowing the molten metal adhering thereto to freeze.

5. The method of making a metal honeycomb which comprises the steps of selecting a plurality of metal strips, each having a plurality of spaced areas disposed in a common plane and separated by other areas displaced in a common direction out of said plane, treating said strips to inhibit adherence to the surfaces thereof of another metal in molten condition, thereafter treating the coplanar areas of each of said strips to render such areas receptive to such other metal in molten condition, arranging said strips in a series with the coplanar areas of each strip in substantially-engaging registry with the coplanar areas of at least one other strip, dipping all of said strips, while held in such arrangement, into a molten bath of such other metal to immerse all of said receptive areas therein, exerting pressure upon said arrangement of strips to move the receptive areas of adjacent strips toward each other while such areas are immersed, removing said strips from said bath while continuing such pressure substantially througout the freezing of such other metal adhering to said strips, to produce a honeycomb structure, treating the surfaces at and immediately adjacent one cellular end of the honeycomb structure to render such surfaces receptive to another metal in molten condition, selecting a further sheet proportioned and designed substantially to cover said end of said structure, treating said further sheet to inhibit adherence to the surfaces thereof of said last-mentioned metal in molten condition, treating one major surface of said further sheet to render said surface receptive to such other metal in molten condition, bringing the receptive surface of said further sheet into juxtaposed but separated registry with said end of said honeycomb structure, immersing the juxtaposed, receptive surfaces of said honeycomb structure and of said further sheet in a molten bath of such other metal, exerting a force against said honeycomb structure and said further sheet to move the receptive surfaces of said honeycomb structure and of said further sheet toward each other while said receptive surfaces are so immersed, removing said honeycomb structure and said further sheet from said bath while substantially maintaining such force, and allowing the molten metal adhering thereto to freeze.

6. The method of sealing a cellular end of a metal honeycomb structure which comprises the steps of selecting a metal sheet proportioned and designed substantially to cover one cellular end of said structure, treating one major surface of said sheet and the surfaces at and immediately adjacent said end of said structure to render said surfaces receptive to another metal in molten condition, bringing the receptive surface of said sheet into juxtaposed but separated registry with said end of said honeycomb structure, immersing the juxtaposed surfaces of said sheet and of said honeycomb structure in a molten bath of such other metal, exerting a force against said honeycomb structure and said sheet to move said sheet and said honeycomb structure toward each other while so immersed, removing said honeycomb structure and said sheet from said bath while substantially maintaining such force, and allowing the molten metal adhering thereto to freeze.

7. The method of sealing a cellular end of a metal honeycomb structure, at least some of whose surfaces have been treated to inhibit adherence thereto of another metal in molten condition, which comprises the steps of selecting a metal sheet proportioned and designed substantially to cover said end of said honeycomb structure, treating said sheet to inhibit adherence to the surfaces thereof of such other metal in molten condition, thereafter treating one major surface of said sheet and the surfaces at and immediately adjacent said end of said structure to render said surfaces receptive to another metal in molten condition, bringing the receptive surface of said sheet into juxtaposed but separated registry with said end of said honeycomb structure, immersing the juxtaposed surfaces of said sheet and of said honeycomb structure in a molten bath of such other metal, exerting a force against said sheet and said honeycomb structure to move said juxtaposed surfaces toward each other while said surfaces are so immersed, removing said honeycomb structure and said sheet from said bath while substantially maintaining such force, and allowing the molten metal adhering thereto to freeze.

8. The method of making a metal honeycomb which comprises the steps of selecting a plurality of metal strips, each having a plurality of spaced areas disposed in a common plane and separated by other areas displaced in a common direction out of said plane, said first-named areas being joined to adjacent ones of said other areas by intermediate areas inclined with respect to said common plane, treating the coplanar areas, and regions of said intermediate areas closely adjacent said coplanar areas of each of said strips to render such areas and said regions receptive to another metal in molten condition, arranging said strips in a series with the coplanar areas of each strip in substantialy-engaging registry with the coplanar areas of at least one other strip, dipping all of said strips, while held in such arrangement, into a molten bath of such other metal to immerse all of said treated areas therein, exerting pressure upon said arrangement of strips to move the treated areas of adjacent strips toward each other while such areas are immersed, and then removing said strips from said bath while continuing such pressure substantially throughout the freezing of such other metal adhering to said strips.

9. The method of bonding together surface-oxidized pieces of ferrous metal which comprises the steps of coating selected, separated, coplanar areas of each such piece with lead, dipping such lead-coated areas into a fused alkali chloride bath, bringing such lead-coated areas of one piece into close but separated juxtaposition to lead-coated areas of the other piece, dipping the two pieces, while held in such juxtaposition, into a bath of molten aluminum to immerse such lead-coated areas therein, exerting pressure upon said pieces to move such areas of the two pieces toward each other while such areas are so immersed, and removing said pieces from the bath, while continuing such pressure substantially throughout the freezing of the aluminum adhering to said areas.

10. The method of making a metal honeycomb which comprises the steps of selecting a plurality of surface-oxidized ferrous metal strips, each having a plurality of spaced areas disposed in a common plane and separated by other areas displaced in a common direction out of said plane, coating the coplanar areas of each of said strips with lead, dipping such lead-coated areas into a fused alkali chloride bath, arranging said strips in a series with the coplanar areas of each strip in slightly-separated registry with the coplanar areas of at least one other strip and holding said strips against relative movement in directions parallel with said coplanar areas, dipping all of said strips, while held in such arrangement, into a bath of molten aluminum to immerse all of said lead-coated areas therein, exerting pressure upon said arrangement of strips to move the coplanar areas of adjacent strips, in a direction substantially perpendicular to said coplanar areas, toward each other while such areas are immersed, and then removing said strips from said bath while continuing such pressure substantially throughout the freezing of the aluminum adhering to said strips.

11. The method of making a metal honeycomb which comprises the steps of selecting a plurality of surface-oxidized ferrous metal strips, each having a plurality of spaced areas disposed in a common plane and separated by other areas displaced in a common direction out of said plane, coating the coplanar areas of each of said strips with lead, arranging said strips in a series with the coplanar areas of each strip in slightly-separated registry with the coplanar areas of at least one other strip and holding said strips against relative movement in directions parallel with said coplanar areas, dipping all of said strips, while held in such arrangement, into a bath of molten aluminum to immerse all of said lead-coated areas therein, exerting pressure upon said arrangement of strips to move the coplanar areas of adjacent strips, in a direction substantially perpendicular to said coplanar areas, toward each other while such areas are immersed, then removing said strips from said bath while continuing such pressure substantially throughout the freezing of the aluminum adhering to said strips, to produce a honeycomb structure, coating the surfaces at and immediately adjacent one cellular end of the honeycomb structure with lead, selecting a further sheet of surface-oxidized ferrous metal proportioned and designed substantially to cover said end of said structure, coating one major surface of said further sheet with lead, bringing the lead-coated surface of said further sheet into juxtaposed but separated registry with said end of said honeycomb structure, immersing the juxtaposed, lead-coated surfaces of said honeycomb structure and of said further sheet in a molten aluminum bath, exerting a force against said honeycomb structure and said further sheet to move said treated surfaces of said honeycomb structure and of said further sheet toward each other while said treated surfaces are so immersed, removing said honeycomb structure and said further sheet from said bath while substantially maintaining such force, and allowing the aluminum adhering thereto to freeze.

12. In the method of making a metal honeycomb which comprises the steps of selecting a plurality of metal strips, each having a plurality of spaced areas disposed in a common plane and separated by other areas displaced in a common direction out of said plane, treating substantially the entire surface of each of said strips to inhibit the adherence thereto of another metal in molten condition, then treating the coplanar areas of each of said strips to render such areas receptive to such other metal in molten condition, arranging said strips in a series with the coplanar areas of each strip in slightly-separated registry with the coplanar areas of at least one other strip, dipping all of said strips, while held in such arrangement, into a molten bath of such other metal to immerse all of said treated areas therein, exerting pressure upon said arrangement of strips urging the treated areas of adjacent strips toward each other while such areas are immersed, and then removing said strips from said bath while continuing such pressure substantially throughout the freezing of such other metal adhering to said strips, those steps which consist of arranging said strips in a series with the coplanar areas of each strip in slightly-separated registry with the coplanar areas of at least one other strip in a framework which holds said strips against relative movement in directions parallel with said coplanar areas and permits movement of said strips in a direction perpendicular to said coplanar areas, dipping all of said strips, while held in such arrangement, into a molten bath of such other metal to immerse all of said treated areas therein, and exerting pressure upon said arrangement of strips to move the coplanar areas of adjacent strips, in a direction substantially perpendicular to said coplanar areas, toward each other while such areas are immersed.

References Cited in the file of this patent
UNITED STATES PATENTS

| | | |
|---|---|---|
| 895,412 | Badger | Aug. 11, 1908 |
| 1,647,851 | Bentley | Nov. 1, 1927 |
| 1,651,403 | Mongey | Dec. 6, 1927 |
| 1,719,512 | Krembs | July 2, 1929 |
| 1,730,470 | Modine | Oct. 8, 1929 |
| 1,831,534 | Judisch | Nov. 10, 1931 |
| 1,937,810 | Carroll | Dec. 5, 1933 |
| 1,940,850 | Derby | Dec. 26, 1933 |
| 2,024,379 | McCraith | Dec. 17, 1935 |
| 2,094,287 | Zimmerman et al. | Sept. 28, 1937 |
| 2,145,168 | Flagg | Jan. 24, 1939 |
| 2,286,204 | Greulich | June 16, 1942 |
| 2,333,343 | Sendzimir | Nov. 2, 1943 |
| 2,342,357 | Miller | Feb. 22, 1944 |
| 2,399,134 | Miller et al. | Apr. 23, 1946 |
| 2,428,523 | Marshall | Oct. 7, 1947 |
| 2,429,677 | Flint | Oct. 28, 1947 |
| 2,462,136 | Smith | Feb. 22, 1949 |
| 2,473,887 | Jennings et al. | June 21, 1949 |
| 2,539,248 | Lynch et al. | Jan. 23, 1951 |
| 2,558,093 | Kinney | June 26, 1951 |
| 2,609,068 | Pajak | Sept. 2, 1952 |
| 2,646,620 | Geddes et al. | July 28, 1953 |
| 2,662,500 | Fort et al. | Dec. 15, 1953 |
| 2,686,957 | Koerper | Aug. 24, 1954 |
| 2,700,632 | Ackerlind | Jan. 25, 1955 |
| 2,722,735 | Beamish | Nov. 8, 1955 |
| 2,754,784 | Maysmor et al. | July 17, 1956 |
| 2,778,458 | Briggs | Jan. 22, 1957 |
| 2,794,243 | Schweller | June 4, 1957 |
| 2,816,355 | Herman | Dec. 17, 1957 |
| 2,900,713 | Young | Aug. 25, 1959 |

FOREIGN PATENTS

| | | |
|---|---|---|
| 10,894 | Great Britain | 1908 |
| 300,272 | Great Britain | Jan. 17, 1929 |